UNITED STATES PATENT OFFICE.

DAVID SPENCE, OF AKRON, OHIO, ASSIGNOR TO THE B. F. GOODRICH COMPANY, OF NEW YORK, N. Y., A CORPORATION OF NEW YORK.

DYEING OF RUBBER AND RUBBER PRODUCTS.

1,122,653.      Specification of Letters Patent.      Patented Dec. 29, 1914.

No Drawing.      Application filed February 10, 1913. Serial No. 747,225.

*To all whom it may concern:*

Be it known that I, DAVID SPENCE, a subject of the King of Great Britain, residing at Akron, in the county of Summit and State of Ohio, have invented certain new and useful Improvements in Dyeing of Rubber and Rubber Products, of which the following is a specification.

This invention relates to the dyeing of rubber, which, being more or less impervious to water, cannot be dyed at all or only very imperfectly by the ordinary process of dyeing in aqueous solution. Indeed, Weber in his authoritative work on rubber ("*The Chemistry of India Rubber*" page 213) devotes a chapter to the subject of coloring rubber in which he states that "a great many of the splendid so-called anilin dyes have been tried," but that "the idea of utilizing these products for the dyeing of india rubber . . . suffers from a fundamental misconception, or rather, complete ignorance, of the nature of the dyeing process—at any rate with the above named dyes." He concludes by stating:—"Altogether it may safely be said that the anilin dyes and the above named 'soluble lakes' are useless for dyeing india rubber, and only for very limited use for staining it."

A known method for the preparation of colored products from india rubber is to dissolve the rubber and the already-formed dye-stuff in a suitable solvent for both, and then to precipitate the rubber together with the dye-stuff from this solution. This process is expensive, however, and of little practical value. On the other hand the production of colored manufactured products from india rubber is to-day accomplished by the addition of appropriate pigments to the rubber in the process of its manufacture. This method likewise suffers from defects and limitations well known in the art, among which are the restricted choice of pigments capable of withstanding a vulcanizing heat, the expense of many of the colors, etc.

I have discovered that raw rubber as well as the products manufactured from the same by present-day methods are capable of adsorbing a great variety of amins and derivatives of these compounds, and indeed that rubber abstracts these substances, even from very dilute aqueous solutions. I have observed, for example, that when disks of raw rubber are immersed in 2% aqueous solutions of anilin, sulfuric acid, sodium hydrate, and sodium chlorid, for three days, they gain in weight 18.5, 4.8, 6.2 and 4.8 per cent., respectively. Other amins and their derivatives show similar and even greater differences and perhaps the most striking fact of all is the tenacity with which the rubber afterward retains the amin, no amount of washing with water removing the last traces of the amin from the rubber. This amin is apparently held by the rubber colloid in "adsorptive" combination. Taking advantage of these facts, I have found that it is possible to produce in raw rubber and in products prepared from it, solutions of amins—even of those which are not soluble, or only sparingly soluble, in water—and by this means to precipitate on the "fiber" of the rubber-substance itself, or of the products manufactured from it, coloring matter in the manner already known in connection with the dyeing of textiles. For instance, the solutions of amins in rubber may be utilized for the production of coloring matters in the rubber by coupling with aqueous solutions of diazonium salts. The rubber containing primary amin compounds may be used by transforming the amins in the rubber into diazonium compounds in the known manner, which compounds may then be coupled with phenols, amins and their derivatives, so as to form azo-dyes on the fiber of the rubber itself.

In the process of dissolving amins in rubber I may use the amins themselves, or I may transform or decompose salts of these substances by means of the equivalent quantity of bases or acids, or I may promote the liberation of the bases by the presence of suitable bases or acids in such a manner that the said bases are simultaneously adsorbed by the rubber. In some cases the adsorption of the amins by the rubber takes place directly from the solutions of their salts, but as a rule it is better to liberate the amin from its salts as mentioned above. Similarly the adsorption of the amin compound by the rubber may be facilitated if necessary by the addition of suitable organic solvents, such as alcohol, to the aqueous solution of the amin.

This invention is applicable not only to the dyeing of raw rubber but to the dyeing of vulcanized and manufactured articles made from india rubber. The time required for the adsorption of the amin depends on the character of the amin compound to be adsorbed, on the concentration of its solution and on the nature of the rubber itself. Thus anilin is more readily adsorbed by raw rubber than by vulcanized rubber containing filling materials, etc. By warming the solution of the amin, the adsorption of the latter by the rubber is apparently facilitated. Thus it is quite impossible to describe one time of treatment which will be applicable in all cases and the time of treatment required will obviously depend on the thickness of the rubber or rubber article to be treated. In the case of thin sheets of rubber such as crêpe rubber, and manufactured articles of no great thickness, the adsorption of the amin compound takes place in a few hours. Similarly, in diazotizing the amin compound adsorbed by the rubber this is easily accomplished in less than an hour in the case of rubber of no great thickness, and in a few hours' time in the case of rubber articles of greater thickness. In practice, I prefer to work with a dilute diazotizing bath, diazotizing slowly instead of working in stronger solutions effecting more rapid but less efficient diazotization.

The following examples will serve to explain the process:

1. White Ceylon crêpe rubber is soaked at ordinary temperature for about two days in a 2% aqueous solution of anilin, then rinsed with water, or put through the washing mill, and then immersed for about one hour in a 2% solution of nitrite with 4% of sulfuric acid in ice-cold water.

1ª. Rubber treated according to (1) gives with anilin on the fiber of the rubber, anilin yellow in the usual way.

1ᵇ. Rubber treated according to (1) gives with 2% beta-naphthol-sodium solution a blood-red dye in the fiber of the rubber itself.

2. A length of ordinary white rubber tubing such as is used for laboratory and other work is soaked for three days in a 2% aqueous solution of anilin (kept slightly warm) so that the solution is both in and around the tube. It is then completely immersed for 2 hours in a 2% solution of nitrite in ice-cold water, to which dilute sulfuric acid is added from time to time until the strength of the acid in the bath reaches 4%. White rubber tubing, so treated, when washed and treated with 2% beta-naphthol-sodium solution, gives a fine brick-red color. By aging this tubing in storage, small irregularities in color such as may appear throughout the mass when freshly dyed, disappear.

3. Sheets of white plantation rubber were impregnated with a nearly-hot, saturated solution of beta-naphthylamin in water for a short time (12 hours, for example) and azo Turkey red was produced in the rubber by diazotization and coupling with beta-naphthol.

4. A sheet of rubber prepared by vulcanizing mixture of equal parts of white plantation rubber with zinc oxid and 5 parts of sulfur was immersed in a nearly-hot saturated solution of alpha-naphthylamin in water (3 days), washed, and alpha-naphthylamin Bordeaux was produced in the sheet by diazotization for two hours and coupling with beta-naphthol. The color becomes uniform on and through the sheet on aging.

5. Sheets of white plantation rubber were immersed for two days in a 0.5% aqueous solution of dianisidin. The impregnation of the rubber by the base may also be accomplished with suitably concentrated solutions of salts of the base with the addition of the equivalent quantity of soda solution. The impregnated rubber was diazotized and coupled with beta-naphthol. A dark reddish-violet dyestuff was produced in the rubber which could not be washed out by continued washing on the mill and was effective in coloring articles manufactured from this rubber.

By means of my invention, it is obviously possible with the application of methods well known in dyeing chemistry, to obtain a very wide range of colors, some of which are more suitable than others, either because of the ease with which they can be prepared, or because of their fastness and stability, particularly where they have to withstand the effects of vulcanization. Raw rubber, when treated according to my invention, vulcanizes readily.

The products of this invention are new and superior compounds formed by the adsorption of the dyestuff by the rubber colloid. The dyestuff cannot be removed by mechanical washing and only very slowly by extraction with boiling alcohol continually renewed.

I claim:

1. A process for the dyeing of rubber which consists in treating the rubber with an aromatic amin in aqueous solution, then subjecting it to a dye-forming bath.

2. A process for the dyeing of rubber which consists in treating the rubber with an aromatic amin in aqueous solution, diazotizing and coupling in a dye-forming bath substantially as described.

5. 3. Rubber having an azo dye directly combined with or fixed upon its fiber.

In testimony whereof I have hereunto set my hand in the presence of two subscribing witnesses, this 7th day of February 1913.

DAVID SPENCE.

Witnesses:
 WALTER K. MEANS,
 R. M. PIERSON.